United States Patent [19]
DaSilveira

[11] Patent Number: 5,975,027
[45] Date of Patent: Nov. 2, 1999

[54] CONFIGURABLE STANCHION AND METHOD OF CONFIGURATION

[76] Inventor: John D. DaSilveira, P.O. Box 1408, Lovington, N.Mex. 88260

[21] Appl. No.: 08/889,123

[22] Filed: Jul. 7, 1997

Related U.S. Application Data

[63] Continuation-in-part of application No. 08/347,714, Dec. 1, 1994, Pat. No. 5,645,015.

[51] Int. Cl.$^6$ ....................................................... A01K 1/08
[52] U.S. Cl. ............................................................. 119/741
[58] Field of Search ................................... 119/730, 732, 119/735, 739, 740, 750, 741

[56] References Cited

U.S. PATENT DOCUMENTS

| | | |
|---|---|---|
| 2,685,864 | 8/1954 | Lilly ......................................... 119/750 |
| 4,574,741 | 3/1986 | Mahler ..................................... 119/735 |

*Primary Examiner*—Robert P. Swiatek
*Assistant Examiner*—Elizabeth Shaw

*Attorney, Agent, or Firm*—Royston, Rayzor, Vickery, Novak & Druce, L.L.P.

[57] ABSTRACT

A method for configuring a livestock stanchion between various orientations. The method includes providing a livestock restraining stanchion having two upright members that define a stanchion opening therebetween and through which an animal's head is insertable. A pivotal restraining member is positioned within the stanchion opening and is adaptable for restricting the size of the opening for releasably restraining an animal therein by entrapping the animal's head after insertion therein. At least one of the upright members is inwardly and outwardly movable relative to the other and oppositely positioned upright member for expanding and constricting a width of the stanchion opening. In one configuration, the movable upright member is positioned away from the opposite upright member into an expanded configuration thereby enlarging the width of the stanchion opening. Optionally, the upright member may also be canted toward the opposite upright member into a lock-out configuration thereby constricting the width of the stanchion opening.

12 Claims, 4 Drawing Sheets

CONFIGURABLE STANCHION AND METHOD OF CONFIGURATION

This is a continuation-in-part of U.S. patent application Ser. No. 08/347,714 filed Dec. 1, 1994, now U.S. Pat. No. 5,645,015.

FIELD OF THE INVENTION

This invention relates to livestock stanchions. More particularly, it relates to livestock stanchions primarily useable with cattle that are adaptable between one or more optional configurations including (1) an expanded accommodating configuration, (2) a cattle lock-out configuration, (3) a training configuration, and (4) a releasably restraining configuration.

BACKGROUND AND SUMMARY OF THE INVENTION

Stanchions suitable for holding the head of an animal are known in the art. Stanchions can be used to restrain horses or goats, but are typically used to restrain cattle. The stanchions are generally used to restrain one or more head of cattle for brief periods of time. By restraining cattle during feeding, consumption may be monitored to ensure that the animals are allocated an appropriate amount of food. Restraining the cattle also facilitates veterinary examination and treatment, protecting both the animal and the attendant or veterinarian from potential injury. In dairies, stanchions are often employed to hold the cattle during the milking process. Cattle stanchions may also be used to temporarily separate one or more head of cattle from the herd.

There are, however, several deficiencies in those stanchions of known designs. As an example, even if a bank or series of stanchions is going to be used with one type of animal, for instance cattle, it is not necessarily true that all of the cattle will be of appropriate size to use uniformly sized stanchion openings. Oftentimes bulls or male cattle will be significantly larger than the other female cows and calves. If there is a significant disparity between the size of the cattle in a particular herd serviced by a stanchion, problems may be encountered if the larger animals can not insert their heads in the stanchion openings, or the stanchion will not operate as designed when the larger head is in place. It is also possible that these larger animals will insert their heads into the stanchion opening when the restraining bar is released and it is intended that the animal may insert its head without entrapments. For the larger animal, if the stanchion opening is not expanded, the freely moving restraining bar may bear against the animal's head and neck regardless of the fact that the bar does not latch, and hurt that animal's ears when the head is withdrawn. This type of pain will not only startle the animal, but it will also make the animal wary of inserting its head into the stanchion opening, a result that is counter to the intended purposes of the stanchion. In view of this need to accommodate differently sized animals, it has been recognized as desirable, and the present invention has been designed to be adaptable into an expanded accommodating configuration in which the opening of the stanchion is enlarged.

Stanchions of known designs are intended to accommodate the insertion of an animal's head and releasably secure the animal until freed by an attendant. Those designs, however, do not provide means, nor are they configurable to lock the animal's head out. There are times during which it will be desired to use the stanchion as a block to the animals' admission; for example, to a feeding trough or milking station. In view of this need to preclude animal head insertion at various times, it has been recognized as desirable, and the present invention has been designed to be adaptable into a lock-out configuration in which the opening of the stanchion is releasably closed.

Stanchion are often times unfamiliar to cattle and therefore they may shy away from them and refuse to insert their heads. A primary reason for this is the narrow passage through which they must place their heads into the stanchion. Known designs, however, do not provide means, nor are they configurable to train an animal to their use. In view of this need to acclimate animals to the stanchion's use, it has been recognized as desirable, and the present invention has been designed to be progressively adaptable from an expanded accommodating configuration down to a releasably restraining configuration in which the animal may be held in the stanchion.

Though none of the above described configurations are known in presently available stanchion designs, it has been recognized as being of special benefit to have a single stanchion design in which the four configurations are accommodatable. The present invention has been designed for just such adaptation.

Still further, latching mechanisms of known designs presently used on stanchions release in response to a pressing action at or near the top of the stanchion opening within which the animal's head is confined. Experience has shown that animals may either intentionally or inadvertently as a result of their movement prematurely release the restraining bar before the attendant is ready. This can be dangerous for both the animal and attendant. Therefore, the present invention incorporates a new latch design that can not be released either by a pressing action from below or above the mechanism as may occur when an animal's ears flop about the top region of the stanchion opening.

In at least one embodiment, the present invention is a method for configuring a livestock stanchion between various orientations. The method includes providing a livestock restraining stanchion having two upright members that define a stanchion opening therebetween and through which an animal's head is insertable. A pivotal restraining member is positioned within the stanchion opening and is adaptable for restricting the size of the opening for releasably restraining an animal therein by entrapping the animal's head after insertion therein. At least one of the upright members is inwardly and outwardly movable relative to the other and oppositely positioned upright member for expanding and constricting a width of the stanchion opening. In one configuration, the movable upright member is positioned away from the opposite upright member into an expanded configuration thereby enlarging the width of the stanchion opening.

Optionally, the movable upright member may be moved to an extreme outward position so that an inserted animal's head is withdrawable from the stanchion opening when the pivotal restraining member is in a latched configuration.

Still further, the movable upright member may be moved to an expanded training position so that an animal unaccustomed to using the stanchion will not be deterred from inserting its head into the stanchion opening. To gradually orient the animal to the stanchion, the movable upright member is advanced inwardly from the expanded beginning training position at increments toward a releasable restraining configuration. As a result, an animal unaccustomed to using the livestock stanchion may be acclimated by advancing the movable upright member inwardly at regular intervals from the expanded training position along incremental positions toward the releasable restraining configuration in which the acclimated animal may be releasably secured. To accomplish securement of the animal, the restraining member is moved into a latched position thereby securing an acclimated animal within the stanchion opening.

The restraining member may be secured into the latched position using a latching assembly requiring outward, substantially horizontal pressure to actuate release of the restraining member. This feature helps to assure that the latch is not inadvertently disengaged by the animal's movement. Unlatching of the restraining member is accomplished by an attendant imparting outward, substantially horizontal pressure at a location within the latching assembly thereby releasing the restraining member from an animal securing orientation. Optionally, the latching assembly may be rotated about a substantially horizontal axis thereby releasing the restraining member from an animal securing orientation. Still further, an aligned tongue within a groove may be utilized for selecting between a latching and non-latching configuration of the latching assembly. By selectively aligning one of a plurality of tongues within the groove, selections between the latching and non-latching configuration of the latching assembly may be made.

In this same embodiment, because the movable upright member is pivotable in at least two directions about its lower end, that upright member may also be canted toward the opposite upright member into a lock-out configuration thereby constricting the width of the stanchion opening.

In an alternative embodiment, the movable upright member is only pivotable toward the opposite upright member into a lock-out configuration thereby constricting the width of the stanchion opening. In this configuration, insertion of an animal's head into the stanchion opening is prevented by the constriction of the width of the stanchion opening by the canting of the movable upright member thereacross.

As has been previously disclosed, one type of cattle stanchion includes a frame with at least one opening for receiving the head of an animal and a latching mechanism for alternately restraining and releasing the animal. One example of this type of cattle stanchion is shown in U.S. Pat. No. Re. 34,232. The disclosed stanchion includes a pivotal restraining member mounted in the opening of the frame. The pivotal restraining member may be moved between a vertical position for holding the head of an animal and a diagonally-extending position when not in use. The disclosure also includes a latching mechanism which may be set by an attendant to either a latched or an unlatched position. When in the latched position, the latching mechanism will engage the pivot bar as it is pivoted to the vertical position, securing the animal's head with the stanchion. The animal may be released by moving the latching mechanism to the unlatched position. If desired, the attendant may leave the latching mechanism in the unlatched position so that the animals may freely insert their heads into the stanchion and remove their heads from the stanchion.

However, cattle not being the most intelligent of animals, tend not to feed through a stanchion if they have been raised in a pasture without prior exposure to stanchions. If these animals are moved from the pasture to a feeding area with stanchions, these animals may starve without human intervention.

Several designs of stanchions have been patented. Examples of a few are shown in U.S. Pat. No. 5,289,798, U.S. Pat. No. 4,476,815, U.S. Pat. No. 4,051,813, and U.S. Pat. No. 1,077,519. However none of these designs have included disclosure of an adjustable stanchion with a restraining bar for acclimating animals for feeding through a stanchion.

An adjustable stanchion with an adjustable substantially vertical extending side frame member is desirable. With an adjustable side frame member, the adjustable member can be moved to enlarge the stanchion opening so that cattle may feed through the stanchion without having to rotate the pivotal restraining bar. The adjustable side frame member can be moved to slowly close the stanchion opening to acclimate the cattle to the stanchion whereby the cattle would still be able to feed while becoming accustomed to the stanchion. Thus the adjustable member could be returned to its original position and the pasture cattle would be using the stanchion as other acclimated cattle. An adjustable stanchion would thereby provide an improved cattle stanchion by offering a single stanchion that can be used for both acclimated and pasture cattle and a method for acclimating cattle without excessive human involvement. An adjustable stanchion which contained a plurality of adjustable side frame members to accommodate several cattle is similarly desirable.

An adjustable cattle stanchion with a displacing assembly connected to a side frame member whereby the displacing assembly can controllably move the adjustable side frame member to several different sizes to increase or decrease the stanchion opening is also desired.

An adjustable cattle stanchion containing several stanchion openings with a displacing assembly connected to several adjustable side frame members which can move several side frame members concurrently is also desired. By utilizing a displacing assembly, several adjustable side frame members may be moved concurrently, thereby several stanchion openings could be enlarged at once, and thus several heads of cattle could acclimate at one time.

An adjustable cattle stanchion where the adjustable side frame member may be moved in several different orientations in relation to the stationary side member is another desire. The adjustable side frame member could be moved parallel to the stationary side frame member or be moved diagonally to the stationary frame side member whereby the upper end of the adjustable side frame member is pointing toward or away from the stationary side frame member. By allowing several different orientations for the adjustable side frame member, an owner can decide which orientation is best suited to acclimate their cattle to the stanchion.

This invention includes features and/or components that have been invented and selected for their individual and combined benefits and superior performance as a livestock stanchion. The system includes multiple components that individually and singularly have new and novel features in and of themselves. Each of the individual components, however, work in association with, and are optimally mated to the others. Together, they yield an overall stanchion system that has superior collective effectiveness in controlling livestock.

Accordingly, a primary object of the present invention is to provide a cattle stanchion with an adjustable side frame member which may be positioned to acclimate cattle to a stanchion.

A further object of the present invention is to provide a method of acclimating cattle to a stanchion.

An additional object of the present invention is to provide a displacing assembly whereby the adjustable side frame member can be controllably moved to allow several different sizes of stanchion openings.

Another object of the present invention is to provide a displacing assembly connected to several adjustable side frame members so that several different stanchion openings may be controlled concurrently.

A further object of the present invention is to provide an adjustable size frame member that may be moved in several different orientations.

A more general object of the present invention is to provide an adjustable stanchion which may be used to efficiently and conveniently acclimate animals to a stanchion and which may be efficiently and inexpensively manufactured and maintained.

In accordance with these aims, the stanchion of the present invention provides a stanchion comprising a frame having a first substantially horizontal extending frame member and having first and second substantially vertical extending side frame members couple the first substantially horizontal extending frame member. The second substantially vertical extending side frame member displaces generally longitudinally from the first substantially vertical extending side frame member and the frame members define a stanchion opening therebetween. A restraining member is disposed in the stanchion opening, the restraining member being pivotally mounted to the frame for movement between a first position with the restraining member extending diagonally across the stanchion opening and a second position with the restraining member having a substantially vertical orientation.

Another embodiment of the present invention provides a stanchion comprising a frame having a first substantially horizontal extending frame member, a second substantially horizontal extending frame member in general proximate coextensive relation to the first frame member. A first substantially vertical extending side frame member couples the first frame member. A second substantially vertical extending side frame member couples the second frame member and the frame members define a stanchion opening therebetween. A restraining member is disposed in the stanchion opening, whereby the restraining member is pivotally mounted to the frame for movement between a first position with the restraining member extending diagonally across the stanchion opening and a second position with the restraining member having a substantially vertical orientation.

An embodiment of the present invention is a stanchion comprising a frame having a first substantially horizontal extending frame member, a second substantially horizontal extending frame member in general proximate relation to the first frame member, a third substantially horizontal extending frame member, a fourth substantially horizontal extending frame member in general proximate relation to the third frame member, a first substantially vertical extending side frame member couples the first and third frame members and a second substantially vertical extending side frame member couples the second and fourth frame members and the frame members define a stanchion opening therebetween. A restraining member is disposed in the stanchion opening, whereby the restraining member is pivotally mounted to the frame for movement between a first position with the restraining member extending diagonally across the stanchion opening and a second position with the restraining member having a substantially vertical orientation.

Another embodiment of the present invention is a method of acclimating animals to a stanchion comprising several steps. The first step is providing a stanchion comprising a frame forming a stanchion opening therebetween, wherein the frame further comprising a first substantially vertical extending side frame member and a second substantially vertical extending side frame member. The second step is displacing the second vertical side frame member from the first vertical side frame member. The third step is moving the second vertical side frame member toward the first side frame member thereby reducing the stanchion opening whereby the animals are acclimated to the stanchion and the stanchion can restrain the animals.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF DRAWINGS

The present invention is further described in connection with the accompanying drawings, in which:

FIG. 4A is perspective view of an embodiment showing a plurality of stanchions with the second substantially vertical extending side frame members in a secured position.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, by not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

Figures 1, 2, 3:
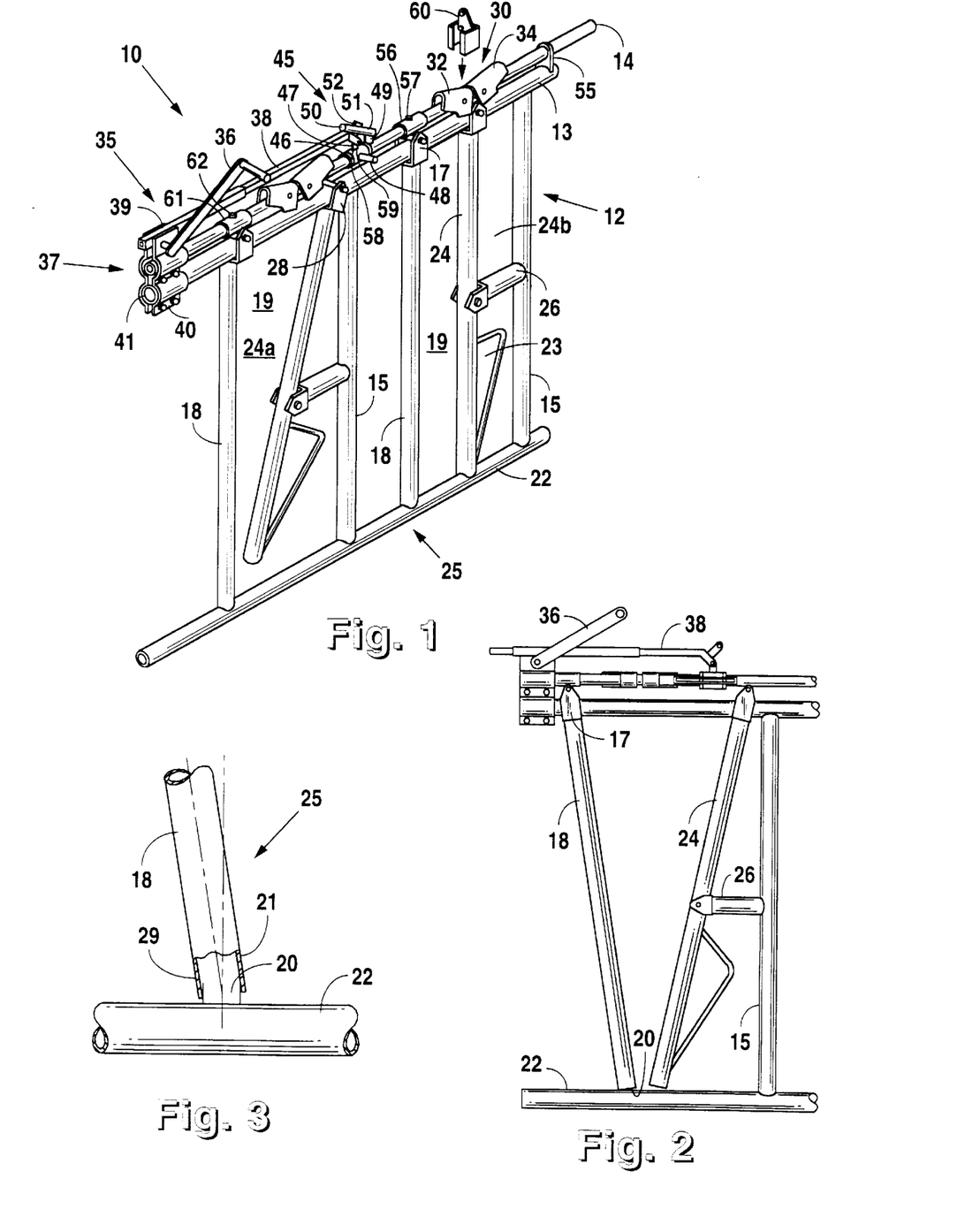
FIG. 1 is a perspective view of an embodiment of the adjustable stanchion showing a plurality of two stanchions. The second substantially vertical extending side frame members are in a secured position.
FIG. 2 is a front view of a single stanchion with the second substantially vertical extending side frame member moved longitudinally away from the first substantially vertical extending side frame member to increase the size of the stanchion opening.
FIG. 3 is an enlarged view of the lower end of the second substantially vertical extending side frame member angularly coupling the protrusion.

One embodiment of the present invention is illustrated in FIGS. 1–3. Referring now to FIG. 1, reference numeral 10 a stanchion, which is preferably made from various size pieces of shaped steel welded together. However, it should be pointed out that the improved stanchion could as well be manufactured from other materials such as metal rods, angle iron, plastic tubes, so that for the purpose of this description the term "member" as used hereinafter shall be understood to include these kinds of materials even though steel pipe is presently preferred due to its strength.

The stanchion 10 generally includes a frame 12 with a plurality of stanchion openings 19 and a plurality of substantially vertical extending side frame members 15 and 18 comprising a plurality of first substantially vertical extending side frame members 15 and second substantially vertical extending side frame members 18. Two openings are shown in FIG. 1; however, it is to be understood that frame 12 may include any number of stanchion openings 19. Each frame 12 comprises first and second substantially vertical extending side frame members 15 and 18, a substantially horizontal extending first frame member 13 and a substantially horizontal extending second frame member 14, which is preferably a horizontally extending locking frame rail. Side frame member 15 couples with horizontal frame member 13. Side frame member 18 couples with horizontal frame member 14. The upper end of side frame member 18 includes a supporting ring 17 which encircles frame member 13 whereby the ring 17 can slide over frame member 13. Referring to FIGS. 1 and 3, a protrusion 20 couples with the lower end of side frame member 18 whereby the protrusion 20 secures side frame member 18 as illustrated in FIGS. 1 and 3. In a preferred form of this embodiment, frame 12 also includes a substantially horizontal extending third frame member 22 which couples side frame member 15 and protrusion 20. Stanchion 10 also includes a restraining member 24 pivotally mounted to one of the side frame members of each stanchion opening 19 for safely restraining the head of an animal.

In FIG. 1, restraining member 24, which is preferably a restraining bar, couples lateral arm 26 mounted to side frame member 15. As shown in FIG. 1, the restraining member 24 may be pivoted between a first position extending diagonally across the stanchion opening as shown at 24a and a second, substantially vertical position as in the stanchion opening as shown in configuration 24b. When the restraining member 24 is in the position corresponding to stanchion opening 24a, an animal may insert its head into the area of the stanchion opening 19 above restraining member 24. When the animal lowers its head, the restraining member 24 is pivoted to the vertical position as shown in configuration 24b. Since the area between the vertically oriented restraining member 24 and side frame member 18 is narrower than the animal's head, locking the restraining member 24 in the vertical position will restrain the animal in the stanchion. When unlatched, the restraining member 24 may be pivoted by the animal to the diagonally-extending position of stanchion 24a so that the animal may remove its head.

The upper end of the restraining member 24 includes a retaining ring 28 which is mounted to first frame member 13. The retaining ring 28 slides along the first frame member as the restraining member 24 pivots at a distal end of lateral arm 26. Retaining ring 28 is shaped to extend above the first frame member 13 so that the ring 28 may be engaged by a latching assembly 30, comprising a plurality of latches 32 and 34 mounted upon second frame member 14, to secure the restraining member 24 in the vertically oriented position 24b. Restraining member 24 also preferably includes an angular arm 23 which prevents the insertion of an animal head into the area below the lateral arm 26 and the restraining member 24. Angular arm 23 also serves as a weight bar which causes restraining member 24 to pivot to the open position 24a when member 24 is unlatched.

A displacing assembly 35 comprising a handle 36, a gear means 37 comprising a gear, an elongated bar 38 wherein one end has a serrated side matable with the gear, an elongated bar sheath housing 39, and a plurality of brackets 40 and 41. The handle 36 couples the gear via an opening in the bracket 40 where the brackets 40 and 41 couple together around first frame member 13 and second frame member 14. The gear resides inside of brackets 40 and 41 wherein brackets 40 and 41 contain and support the gear and handle 36. The serrated side is on the lower side of the elongated bar 38. The elongated bar 38 is supported by the elongated bar sheath housing 39 which exposes the serrated side of the elongated bar 38 to the gear. The elongated bar 38 couples second frame member 14 via a network of links 45. The second frame member 14 in turn pivotally couples the supporting ring 17. Supporting ring 17 attaches to frame member 14 via cylindrical sleeve 56 which forms a slit and cylindrical sleeve screw 57. As shown in FIG. 3, the securing assembly 25 comprising member 18 whose lower end forms cavity 21 and protrusion 20 whereby the interior walls 29 of the lower end pivotally couple with protrusion 20.

To operate the displacing assembly 35 to displace second side frame member 18 away from first side frame member 15, an attendant rotates handle 36 as shown in FIG. 1 in a counterclockwise manner which rotates the gear counterclockwise inside of brackets 40 and 41. When displacing member 18 away from member 15, it is preferred to have restraining bar 24 unlatched and in the open position of 24a. The gear interacts with the serrated side of the elongated bar 38 whereby the elongated bar 38 moves in a longitudinal motion; more precisely the network of links 45 coupling elongated bar 38 move closer to brackets 40 and 41 or leftwardly in FIG. 1. As the network of links 45 moves closer, the longitudinal motion of elongated bar 38 transfers to the second frame member 14 via the network of links 45 whereby the second frame member 14 moves in the same general direction as elongated bar 38. This longitudinal motion transfers to second side frame member 18 through supporting ring 17 which slides along the first frame member 13 away from first side frame member 15, which increases the size of stanchion opening 19. Referring to FIGS. 2 and 3, this longitudinal motion is reflected by displacing the upper end of second side frame member 18 farther from first side frame member 15 than its lower end. As the upper end of second side frame member 18 moves away from first side frame member 15, the lower end pivots on protrusion 20 as shown in FIG. 3.

When the attendant wants to decrease the size of stanchion opening 19, the handle 36 is turned clockwise which translates into a longitudinal motion via the gear and elongated bar 38. This motion transfers from the bar 38 to the second frame member 14 through the network of links 45 which also moves it away from brackets 40 and 41. This in turn moves the second side frame member 18 toward the first side frame member 15 to decrease the size of stanchion opening 19. The lower end of second side frame member 18 pivots on protrusion 20 and as the second side frame member 18 returns to its original position as illustrated in FIG. 1, the interior walls 29 of the lower end of the second side frame member 18 pivotally couples with protrusion 20 whereby the second side frame member 18 is in a substantially vertical orientation.

The latching assembly comprising latches 32 and 34 can be orientated into an engaged or disengaged orientation. If engaged, the restraining member 24 will be latched by latches 32 and 34 in a substantially vertical position as shown by 24b in FIG. 1, whereby an animal will be restrained from removing its head from stanchion opening 19. If disengaged, the restraining member 24 will not engage latches 32 and 34 and an animal will be free to remove its head from the stanchion.

The mechanism to engage and disengage the latches 32 and 34 comprises the second frame member 14, support 55, rotation sleeve 46, cylindrical sleeves 56 and 61, cylindrical sleeve screws 57 and 62, and a network of links 45 comprising engage post 47, disengage post 48, support post 49, angle link 50, U-shaped detachable link 51, and coupling link 52. The support 55 connects the first frame member 13 and forms a circular opening where the second frame member 14 is positioned within and extended through the opening. The cylindrical sleeve 56 is coupled to second frame member 14 by a cylindrical sleeve screw 57. When rotating second frame member 14 about its central longitudinal axis, the screw 57 moves within a guiding slit in the cylindrical sleeve 56. The cylindrical sleeve 56 in turn pivotally couples to supporting ring 17. A rotation sleeve 46 is welded approximately midway onto second frame member 14. Welded onto the rotation sleeve 46 is the engage post 47 and the disengage post 48 which are approximately 90 degrees apart. While the latches 32 and 34 are engaged, the angle link 50 couples via a bolt 58 and nut with the engage post 47. A coupling link 52 is welded approximately perpendicular onto the angle link 50. A support post 49 is welded onto the second frame member 14 and is parallel to the engage post 47 when the latches 32 and 34 are engaged. A U-shaped detachable link 51 pivotally couples the support post 49 and can be detachably coupled around the coupling link 52.

To disengage the latches 32 and 34, an attendant uncouples U-shaped detachable link 51 from coupling link 52. Next, grasping coupling link 52, the second frame member 14 rotates until the disengage post 48 is parallel with the support post 49 causing the cylindrical sleeve screws 57 and 62 to slide within slits of cylindrical sleeves 56 and 61. The second frame member 14 rotates within support 55, brackets 40 and 41, and cylindrical sleeves 56 and 61. Once the disengage post 48 is parallel with the support post 49, the U-shaped detachable link 51 pivotally couples around coupling link 52.

For manually locking the restraining member 24 in a vertical position independent of the rotational orientation of second frame member 14, a locking device 60 may couple with latches 32 and 34 and retaining ring 28.

Figures 4, 6:
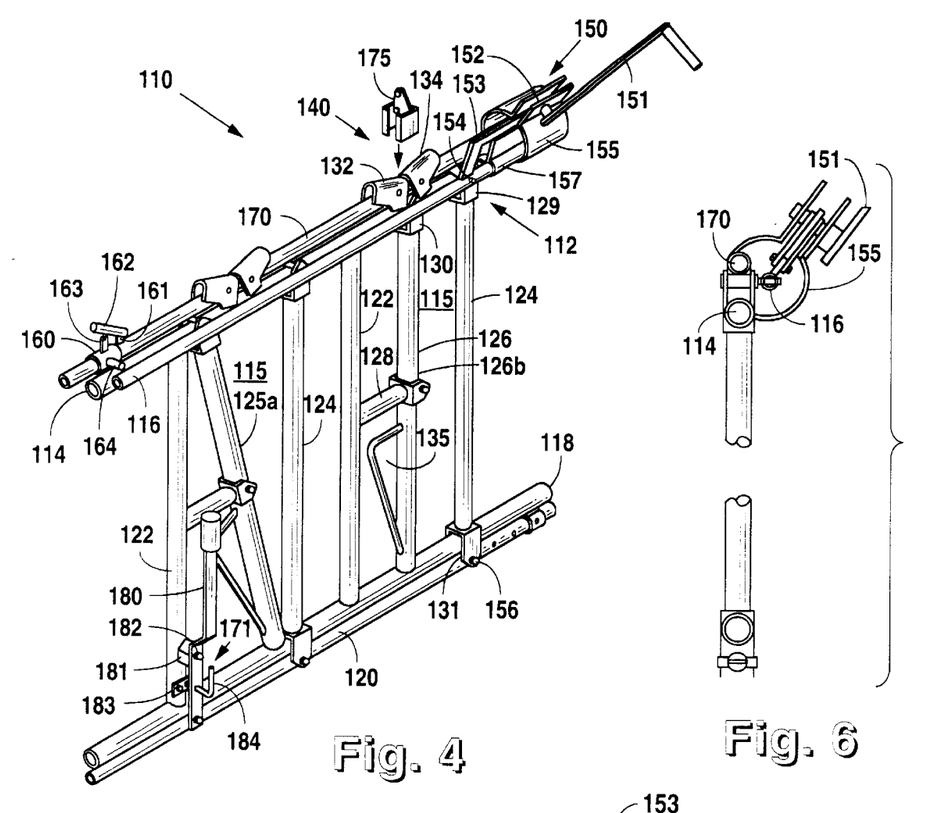
FIG. 6 is side view taken along the plane of line 6—6 in FIG. 6 of the displacing assembly.

Referring now to FIG. 4 which illustrates another embodiment of a stanchion, the stanchion 110 generally includes a frame 112 with a plurality of stanchion openings 115 and a plurality of substantially vertical extending side frame members 122 and 124 comprising a plurality of first substantially vertical extending side frame members 122 and second substantially vertical extending side frame members 124. Two openings are shown in FIG. 4; however, it is to be understood that frame 112 may include any number of stanchion openings 115. Each frame comprises a first substantially vertical extending side frame member 122 and a second substantially vertical extending side frame member 124, a substantially horizontal extending first frame member 114, a substantially horizontal extending second frame member 116 in general proximate relation to the first frame member 114, a substantially horizontal extending third frame member 118, and a substantially horizontal extending fourth frame member 120 in general proximate relation to the third frame member 118. The side frame member 122 is welded to first frame member 114 and to third frame member 118. Side frame member 124 pivotally couples second frame member 116 and fourth frame member 120 whereby all frame members form frame 112. Side frame member 124 has an upper supporting ring 129 at its upper end encompassing the circumference of first frame member 114 and a lower supporting ring 131 at its lower end encompassing the circumference of the third frame member 118. Stanchion 110 also includes a restraining member 126, which is preferably a restraining bar, pivotally mounted to one of the side frame members of each stanchion opening 115 for safely restraining the head of an animal.

In FIG. 4, restraining member 126 couples to lateral arm 128 mounted to side frame member 122. As shown in FIG. 4, the restraining member 126 may be pivoted between a first position extending diagonally across the stanchion opening 126a and a second, substantially vertical position as in stanchion opening 126b. When the restraining member 126 is in the position of stanchion opening 126a, an animal may insert its head into the area of the stanchion opening above restraining member 126. When the animal lowers its head, the restraining member 126 is pivoted to the vertical position shown in configuration 126b. Since the area between the vertically oriented restraining member 126 and side frame member 124 is narrower than the animal's head, locking the restraining member 126 in the vertical position will restrain the animal in the stanchion. When unlatched, the restraining member 126 may be pivoted by the animal to the diagonally-extending position 126a so that the animal may remove its head. The upper end of the restraining member 126 includes a retaining ring 130 which is mounted to first frame member 114. The retaining ring 130 slides along the first frame member 114 as the restraining member 126 pivots about lateral arm 128. Retaining ring 130 is shaped to extend above the first frame member 114 so that the ring may be engaged by a latching assembly 140, which comprises a plurality of latches 132 and 134.

Figure 5:
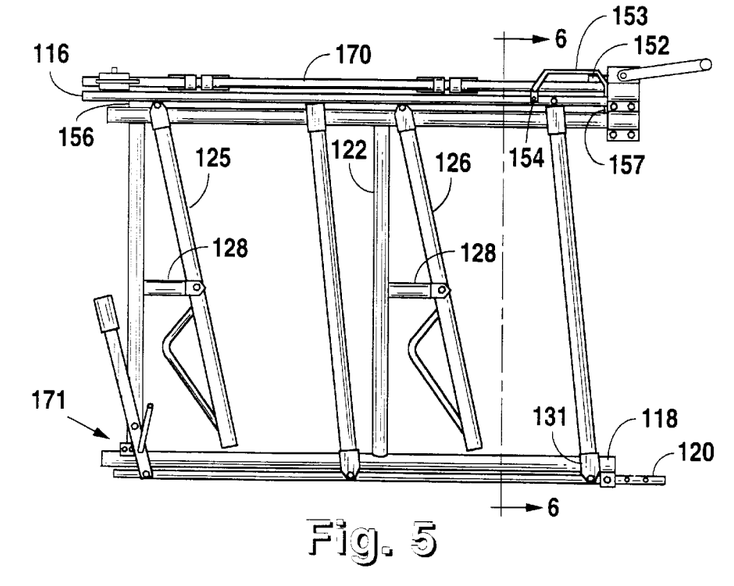
FIG. 5 is a front view of a plurality of stanchions, with the fourth frame member moved to increase the size of the stanchion opening by displacing the second substantially vertical extending side frame member generally diagonally, longitudinally from the first substantially vertical extending side frame member.

Referring to FIG. 5, one embodiment of the invention a plurality of brackets 156 and 157 are welded at approximately either end of the first frame member 114. Brackets 156 and 157 each form an opening in their respective ends. A substantially horizontal extending fifth frame member 170, which is preferably a horizontally extending locking frame rail, couples to brackets 156 and 157 by being inserted and extended through holes in brackets 156 and 157. The fifth frame member 170 is in general proximate coextensive relation to the first frame member 114. The latches 132 and 134 are mounted to the fifth frame member 170 securing the restraining member 126 in the vertically oriented position 126b. Restraining member 126 also preferably includes an angular arm 135 which prevents the insertion of an animal head into the area below the lateral arm 128 and the restraining member 126. Angular arm 135 also serves as a weight bar which causes restraining member 126 to pivot to the open position of 126a when member 126 is left unlatched.

The latching assembly 140 can be orientated into an engaged or disengaged orientation. If engaged, the restraining member 126 will be latched by latches 132 and 134 in the substantially vertical position 126b in FIG. 1, whereby an animal will be restrained from removing its head from stanchion opening 115. If disengaged, the restraining member 126 will not engage latches 132 and 134 and an animal will be free to remove its head from the stanchion.

The mechanism to engage and disengage the latches 132 and 134 comprises of fifth frame member 170, rotation sleeve 160, support post 161, U-shaped detachable link 162, engage post 163, and disengage post 164. The rotation sleeve 160 is welded onto one end of the fifth frame member 170. Support post 161 is welded proximate to the rotation sleeve 160. The U-shaped detachable link 162 pivotally couples the support post 161. The engage post 163 is welded onto the rotation sleeve 160. The disengage post 164 welded approximately 90 degrees away from the engage post 163 on the rotation sleeve 160. When the latches 132 and 134 are engaged, the engage post 163 is parallel to the support post 161 and the U-shaped detachable link 162 detachably couples around the engage post 163.

To disengage the latches 132 and 134, the attendant will first pivot the detachable link 162 upwards uncoupling link 162 from the engage post 163. Grasping the uncoupling link 162, the attendant will rotate the fifth frame member 170 until the disengage post 164 is parallel with the support post 161, at which point the latches 132 and 134 will be disengaged. Then the attendant will pivotally couple the U-shape detachable link 162 to couple around the disengage post 164.

For manually locking the restraining member 126 in a vertical position independent of the rotational orientation of fifth frame member 170, a locking device 175 may couple with latches 132 and 134 and retaining ring 130.

Referring to FIGS. 4 and 5, a first handle 180 couples a pivot support 181 which in turn couples member 122. Handle 180 also couples member 120. A positioning bracket 183 couples member 122. Handle 180 detachably couples bracket 183 via adjusting pin 184. Positioning bracket 183 contains a plurality of coupling points 171 for adjusting member 124 with respect to member 122 by sliding member 120 longitudinally via handle 180. A pivot bolt 182 pivotally mounts handle 180 to support 181.

Referring to FIGS. 4–6, the displacing assembly 150 comprises a second handle 151, a link 152, arched member 153, a post 154, and a support housing 155. The support housing 155 couples to the first frame member 114. The support housing 155 has a hole where the handle 151 pivotally couples the link 152 and extends through the opposing side of the support housing 155. The arched member 153 pivotally couples link 152 and to post 154. The post 154 is welded to the second frame member 116.

In at least one embodiment, it is desirable to allow an attendant several different options for orientating side frame member 124 with respect to side frame member 122. The first option is displacing side frame member 124 diagonally where upper supporting ring 129 is farther from side frame member 122 than lower supporting ring 131. Referring to FIG. 4, an attendant exercising this option pushes the handle 151 downwardly in a clockwise direction. When displacing member 124 from member 122, it is preferred to have restraining member 126 in the open position 126a. The rotation of the handle 151 causes the link 152 to invert thus displacing the arch member 153. This in turn displaces the post 154 coupled to the second frame member 116 toward the support housing 155. The pivotal coupling of upper supporting ring 129 with the second frame member 116 causes the upper supporting ring 129 to be thrust outwards and upwards toward the support housing 155. The ring 129 will slide along first frame member 114 toward the support housing 155.

The second option is displacing side frame member 124 parallel to side frame member 122. Referring to FIG. 4, the plurality of coupling points 171 further comprises three holes, which are referred to as left, middle and right. For parallel displacement of side frame member 124, an attendant pushes handle 151 downwardly in a clockwise direction until the handle 151 becomes horizontal while another attendant at the same time pulls handle 180 away from member 122 by removing adjusting pin 184 from the left hole and repositioning pin 184 in the right hole as shown in FIG. 5. This will thrust both upper and lower supporting rings 129 and 131 away and parallel from side frame member 122.

The third option is displacing the side frame member 124 diagonally where lower supporting ring 131 is farther from side frame member 122 than upper supporting ring 129. An attendant exercising this option pulls handle 180 away from member 122 by removing pin 184 from the left hole as shown in FIG. 4 and repositioning pin 184 in the right hole as shown in FIG. 5. This would thrust the lower supporting ring 131 outward while leaving the handle in its original position as shown in FIG. 5.

Another form of stanchion 110 takes the form as shown in FIG. 4, except member 120, first handle 180, pivot support 181, pivot bolt 182, positioning bracket 183, and adjusting pin 184 are eliminated. Member 124 pivotally couples member 118. Thus member 124 displaces only diagonally to member 122 by turning handle 151 whereby upper supporting ring 129 is farther from side frame member 122 than lower supporting ring 131.

Another embodiment of the invention is a method of acclimating animals to a stanchion by using the present invention. The first step is providing the embodiment of the invention of stanchion 10 as shown by FIG. 1 wherein the stanchion 10 further comprising a frame 12, a first substantially vertical extending side frame member 15, and a second substantially vertical extending side frame member 18, which form stanchion opening 19. The acclimation method is exemplarily conducted over a period of three days where member 18 is displaced and then moved progressively, longitudinally, toward member 15. The next step is for an attendant to rotate handle 36 counterclockwise thereby diagonally displacing the upper end of side member 18 a predetermined distance which ranges approximately between 0.39 meter to 0.50 meter from side member 15 as shown by FIG. 2. The third step begins one day later by turning the handle 36 clockwise one-third of the amount turned counterclockwise the previous day moving side member 18 toward side member 15 and thereby reducing stanchion opening 19. The one-third clockwise turn step is repeated once on the second day and once again on the third day at which time the side frame member 18 will be at its original position as shown in FIG. 1 and the animals will be acclimated to the stanchion and the stanchion 10 can be used to restrain the animals.

The stanchion 110, further comprising frame 112, a first substantially vertical extending side frame member 122, and a second substantially vertical extending side frame member 124 which form stanchion opening 115, can also be used to acclimate animals. Three different possibilities exist for acclimating an animal to stanchion 110 as shown by FIG. 4. The first possibility is a three day process where member 124 is displaced and then moved longitudinally, progressively toward member 122 over time. The first step is providing stanchion 110. The second step is displacing diagonally frame member 124 from side frame member 122 where the upper supporting ring 129 is farther from side frame member 122 than lower supporting ring 131. An attendant lowers handle 151 clockwise whereby upper supporting ring 129 is displaced longitudinally a predetermined distance which is approximately 0.38 meter to 0.51 meter from side frame member 122. The third step begins one day later when the attendant rotates handle 151 counterclockwise one-third of the amount rotated clockwise the day before moving side member 124 toward side member 122 and thereby reducing stanchion opening 115. The one-third counterclockwise rotation step is repeated once on the second day. The one-third rotations can be aligned to either of two holes in the upper corners of support housing 155. The one-third rotation is repeated once again on the third day at which time the side frame member 124 will be at its original position as shown in FIG. 4 and the animals will be acclimated to the stanchion 110 and the stanchion 110 can restrain the animals.

The second possibility also involves using stanchion 110 as shown by FIGS. 4 and 5. The second possibility is a two day process where member 124 is displaced longitudinally a predetermined distance and then moved longitudinally, chronologically toward member 122. The first step is providing stanchion 110. The second step is displacing diagonally member 124 where the lower supporting ring 131 is farther away from side frame member 122 than upper supporting ring 129. An attendant pulls handle 180 away from member 122 as shown in FIG. 5 by removing pin 184 from left hole of bracket 183 to the right hole of bracket 183. Thus, the lower supporting ring 131 is approximately 0.51 meter from side frame member 122. The third step occurs one day later when the attendant repositions handle 180 by removing pin 184 from the right hole and repositions pin 184 in the middle hole of bracket 183. This moves member 124 toward member 122 and thereby reducing stanchion opening 115. On the second day the attendant repositions the handle 180 by removing pin 184 from the middle hole and repositions pin 184 in the left hole of bracket 183 whereby the fourth frame member 120 and side frame member 124 will be back to their original position as shown in FIG. 4 whereby the animals will be acclimated to the stanchion 110 and the stanchion 110 can restrain the animals.

The third possibility involves using stanchion 110 as shown by FIG. 4. The third possibility is a five day process and is a method where side frame member 124 is longitudinally displaced a predetermined distance parallel to side frame member 122. The first step is providing stanchion 110. In a second step, one attendant pulls handle 180 away from member 122 by removing pin 184 from the left hole of bracket 183 and repositioning the pin 184 in the right hole of bracket 183 a while the second attendant simultaneously turns handle 151 downward clockwise displacing side frame member 124 approximately 0.51 meter parallel and from side frame member 122.

The third step begins one day later when the attendant pushes handle 180 toward member 122 by removing pin 184 from the right hole of bracket 183 and repositioning pin 184 in the middle hole of bracket 183 which moves the lower supporting ring 131 toward side frame member 122 thereby reducing stanchion opening 115. The next day the attendant pushes handle 180 back to its original vertical position of FIG. 4 by removing pin 184 from the middle hole of bracket 183 and repositioning pin 184 in the left hole of bracket 183. At this point upper supporting ring 129 is farther from side frame member 122 than lower supporting ring 131. The next day the attendant turns handle 151 counterclockwise one-third of the amount turned clockwise in step two. The next day, day four, the attendant repeats the previous one-third counterclockwise turn of the handle 151. The next day, day five, the attendant repeats the one-third counter-clockwise turn of the handle 151, whereby the side frame member 124 is back to its original position as seen in FIG. 4 and the animals are acclimated to the stanchion 110 and the stanchion 110 can restrain the animals.

As earlier described, a beginning training configuration is shown in FIG. 2 wherein the left upright member 18 is canted outward away from the interior of the stanchion opening 19. This provides a greater distance between the left 18 and right 15 upright members through which an animal must insert its head and as a result, those animals that are unfamiliar with stanchions 10 are more likely to use them. This same outwardly canted configuration of the upright members 15 and 18 establishes an expanded accommodating configuration for larger animals. By widening the opening 19, animals with larger heads may freely insert and withdraw their heads without the risk of injuring their ears or being inadvertently entrapped within the stanchion 10. Such an unintended entrapment may occur if an animal inserts its head into the stanchion opening 19 and for some reason falls so that its neck and head are pressed within the most narrow lower portion of the opening 19. With the expanded opening, the animal will be more likely to be able to free itself.

Because at least the left upright member 18 may be variously pivoted from left to right about its lower end, the size of the stanchion opening 19 is also made variable. The extent to which the upright member 18 may be pivoted ranges from the expanded configuration illustrated in FIG. 2 to a lock-out configuration illustrated in FIG. 7. In the lock-out configuration, the left upright member 18 is canted to an extreme rightward slant substantially across the stanchion opening 19 thereby blocking the insertion of an animal's head.

As described herein above, the left upright member 18 may be variously and progressively positioned from the expanded configuration of FIG. 2 toward the lock-out configuration of FIG. 7. By stopping at a releasably restrainable configuration between these extremes, a training sequence for animals unaccustomed to using the stanchion 10 is achieved. The training sequence is established by moving the left upright member 18 a little closer to the right upright member 15 in a progressive manner as described above. After the restraining configuration is achieved, the stanchion 10 may be regularly used with the acclimated animals.

Figure 7:
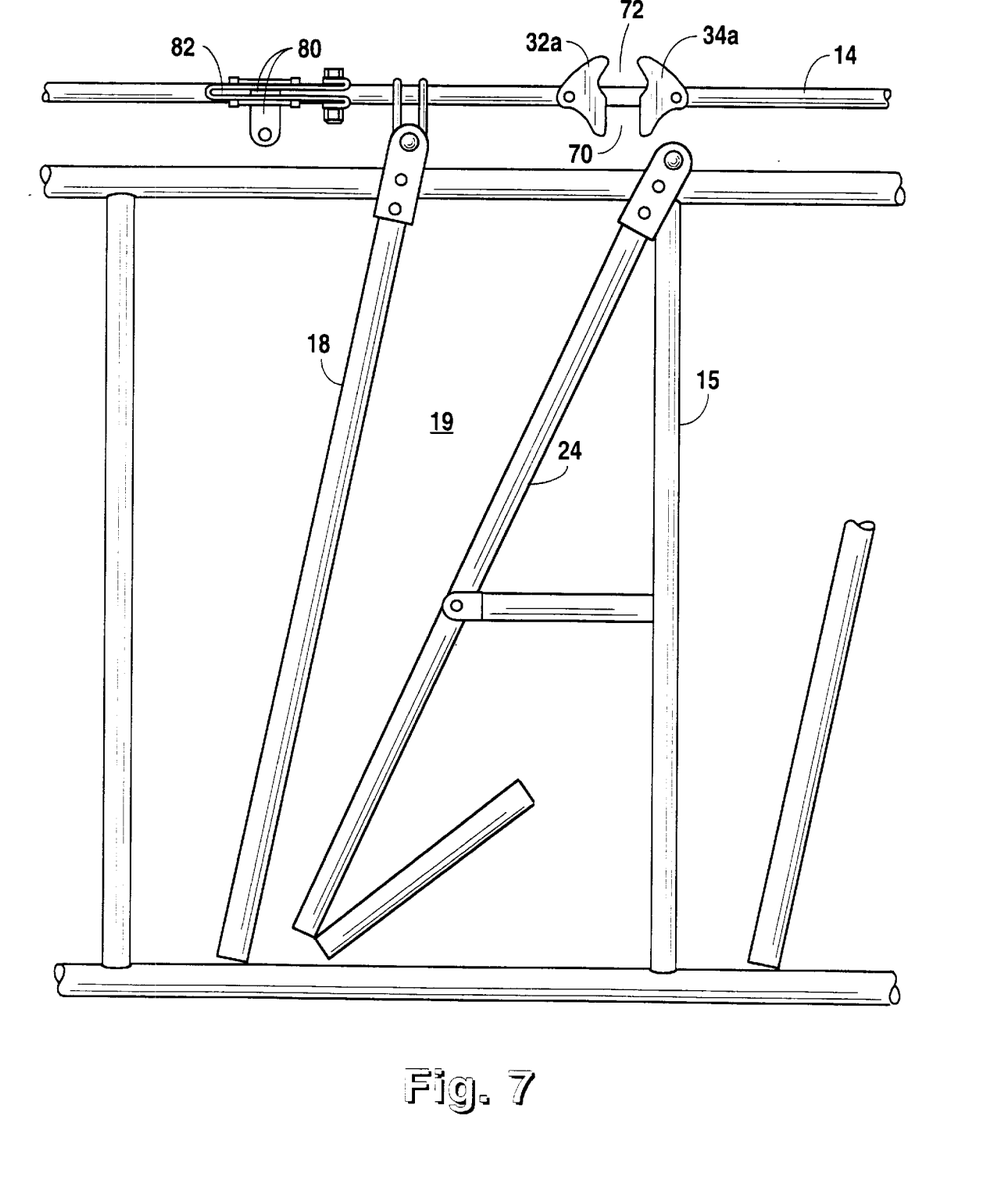
FIG. 7 is a front view of a stanchion in the lock-out configuration.
Figure 8:
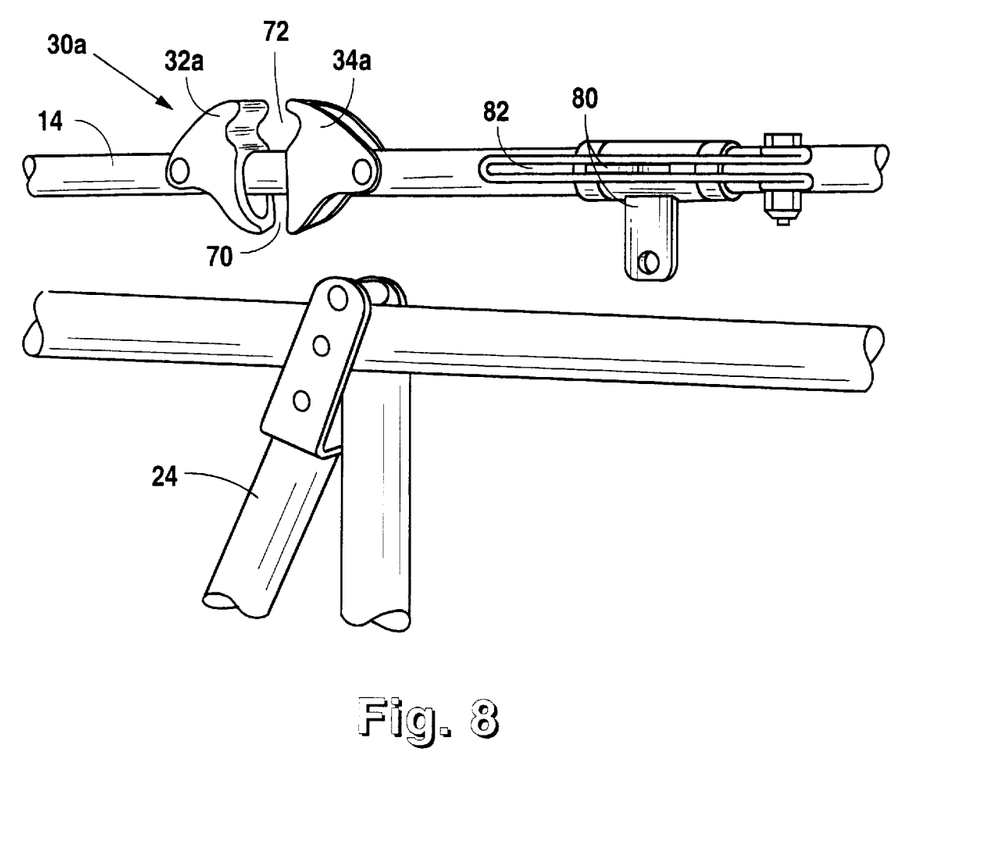
FIG. 8 is a perspective view of the outward force release latch.

An improved latching assembly 30a is illustrated in FIGS. 7 and 8. As explained above, latches of designs similar to that shown in FIG. 1 may be inadvertently released by the entrapped animal before the attendant intends such release. This inadvertent release can result from the animal moving its head about within the restraining stanchion opening 19 to an extent that its flopping ears depresses one of the individual latches 32 or 34. The latch 30a shown in greater detail in FIG. 8 comprises two similarly shaped and opposingly oriented latches 32a and 34a. Each latch 32a,34a is pivotally connected to the stanchion frame 12 at exterior positions to the latching assembly 30a. Each latching assembly 30a, however, is positioned for use similar to those latches 30 of FIG. 1. When in the latched position of FIG. 8, the two latch halves 32a and 34a rest in a configuration establishing a latching space 70 therebetween at a lower portion of the latch assembly 30a. The upper portion of the assembly 30a above the horizontal frame member 14 also has an interior finger space 72 within which an attendant may insert a finger or other instrument for pushing outwardly on one or both of the latches 32a and/or 34a to release a secured restraining member 24 and in turn a restrained animal. By requiring outward pressure from within the finger space 72 to actuate release of the restraining member 24, inadvertent release of the animal is prevented since downward and upward pressure will no longer cause the latch 30a to release. In other regards, the latch assembly 30a of FIG. 8 is capable of cooperating in substantially the same manner as the latch assembly 30 of FIG. 1.

In this regard, the latch assembly 30a is carried upon the rotatable and longitudinally translatable horizontal member 14. Like the orientation shown in FIG. 2 of the latch assembly 30, the alternative latch assembly 30a may also be rotated at ninety degrees to its engagable or latching orientation so that it becomes non-engagable and will not secure a restraining member. Alternatively, if restraining members 24 are secured in one or more of the latches 30a carried on the frame member 14, each may be rotated out of the latching orientation thereby simultaneously releasing all of the secured restraining members 24 and any entrapped animals.

In order to confirm that either the latching orientation versus the rotated release orientation is achieved when alternatively intended, a two-part tongue 80 and a slot or groove 82 are provided in conjunction with the rotatable latch and the carrying member 14. Each tongue 80 corresponds to one of the orientations; and for either orientation to be achievable, one or the other of the tongues 80 must be properly aligned for insertion into the slot 82. This cooperation is illustrated in FIGS. 7 and 8.

A livestock stanchion system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A method for configuring a livestock stanchion between various orientations comprising the steps of:

providing a livestock restraining stanchion having two upright members defining a stanchion opening therebetween through which an animal's head is insertable and a pivotal restraining member positioned within said stanchion opening adaptable for restricting the size of said opening for releaseably restraining an animal therein by entrapping the animal's head, at least one of said upright members being inwardly and outwardly movable relative to the other and oppositely positioned upright member for expanding and constricting a width of the stanchion opening; and providing a latching assembly for securing said pivotal restraining member in a restraining configuration, said latching assembly being exclusively actuable for unlatching by outward pressure exerted upon said latching assembly by an operator at an interior region of said latching assembly.

2. The method for configuring a livestock stanchion between various orientations as recited in claim 1; said method further comprising:

positioning said movable upright member away from said opposite upright member into an expanded configuration thereby enlarging the width of said stanchion opening; and moving said movable upright member to an extreme outward position so that an inserted animal's head may be withdrawn from the stanchion opening when said pivotal restraining member is in a latched configuration.

3. The method for configuring a livestock stanchion between various orientations as recited in claim 2; said method further comprising:

moving said movable upright member to an expanded training position so that an animal unaccustomed to using said stanchion will not be deterred from inserting its head into the stanchion opening.

4. The method for configuring a livestock stanchion between various orientations as recited in claim 3; said method further comprising:

advancing said movable upright member inwardly from said expanded training position at incremental advancements toward a releasable restraining configuration.

5. The method for configuring a livestock stanchion between various orientations as recited in claim 4; said method further comprising:

acclimating an animal unaccustomed to using the livestock stanchion by advancing said movable upright member inwardly at regular intervals from said expanded training position at incremental advancements toward a releasable restraining configuration in which an acclimated animal may be releasably secured.

6. The method for configuring a livestock stanchion between various orientations as recited in claim 5; said method further comprising:

moving the restraining member into a latched position thereby securing an acclimated animal within said stanchion opening.

7. The method for configuring a livestock stanchion between various orientations as recited in claim 6; said method further comprising:

securing said restraining member into the latched position using a latching assembly requiring outward substantially horizontal pressure to actuate release of said restraining member.

8. The method for configuring a livestock stanchion between various orientations as recited in claim 7; said method further comprising:

imparting outward substantially horizontal pressure at a location within said latching assembly thereby releasing said restraining member from an animal securing orientation.

9. The method for configuring a livestock stanchion between various orientations as recited in claim 8; said method further comprising:

rotating said latching assembly about a substantially horizontal axis thereby releasing said restraining member from an animal securing orientation.

10. The method for configuring a livestock stanchion between various orientations as recited in claim 9; said method further comprising:

aligning a tongue within a groove for selecting between a latching and non-latching configuration of the latching assembly.

11. The method for configuring a livestock stanchion between various orientations as recited in claim 10; said method further comprising:

selectively aligning one of a plurality of tongues within said groove for selecting between a latching and non-latching configuration of the latching assembly.

12. The method for configuring a livestock stanchion between various orientations as recited in claim 4; said method further comprising:

canting said movable upright member toward said opposite upright member into a lock-out configuration thereby constricting the width of said stanchion opening.

* * * * *